United States Patent [19]

Bronoël

[11] Patent Number: 4,517,258
[45] Date of Patent: May 14, 1985

[54] ELECTROCHEMICAL GENERATOR OPERATING DEVICE WITH A ZINC NEGATIVE ELECTRODE

[75] Inventor: Guy Bronoël, Versailles, France

[73] Assignee: T.R.E.G.I.E., Rueil Malmaison, France

[21] Appl. No.: 544,229

[22] Filed: Oct. 21, 1983

[30] Foreign Application Priority Data

Oct. 21, 1982 [FR] France ................. 82 17625

[51] Int. Cl.³ ............................. H01M 8/18
[52] U.S. Cl. ........................ 429/21; 429/27; 429/122
[58] Field of Search ............ 429/21, 15, 27, 29, 429/105, 122

[56] References Cited

U.S. PATENT DOCUMENTS 4,133,940 1/1979 Durand ................. 429/15

Primary Examiner—Donald L. Walton
Attorney, Agent, or Firm—Oblon, Fisher, Spivak, McClelland and Maier

[57] ABSTRACT

An electrochemical generator operating device having a zinc electrode of the type known as a scattered electrode using a fluid containing alkaline electrolyte and particles which come in contact with the negative upper face of a flat bipolar current collector when the fluid is not in circulation. The fluid is circulated through the use of an intermittent operating pump and is guided through a plurality of horizontal parallel pipes with a rectangular section in such a manner so that the operation is intermittent both during the recharge and the discharge phases and is further characterized by the fact that the off time of the pump is greater than the on time.

13 Claims, 6 Drawing Figures

ELECTROCHEMICAL GENERATOR OPERATING DEVICE WITH A ZINC NEGATIVE ELECTRODE

BACKGROUND OF THE INVENTION

1. Field of the Invention

This invention relates to a zinc recharging device for negative electrodes that can be used in an electrochemical generator of the type in which the electrodes are immersed in an electrolyte consisting of an alkaline medium charged with zinc salts, and a device for recharging by a direct current for its use and its application particularly to the zinc-nickel batteries.

2. Description of the Prior Art

Zinc can constitute the negative electrode of reversible Zn-Ni or Zn-Air storage batteries operating in a concentrated alkaline medium. However, one of the principal difficulties encountered in the development of these generators is due to the virtual impossibility of subjecting the zinc electrode to a large number of charge and discharge cycles.

Actually, the cycling of a plate-shaped zinc electrode causes the formation of dendrites which short-circuit the electrodes and a change in shape of the electrode which shows itself in a thinning down for one part and the increase of its thickening for another.

Various processes have been offered to eliminate these drawbacks. One of the means making it possible to obtain a number of high charge-discharge cycles, on the order of 500 for example, consists in vibrating the electrodes. Unfortunately, this system proves to be unwieldy, costly and a consumer of energy.

SUMMARY OF THE INVENTION

One of the aims of this invention is specifically to make a zinc recharging device for negative electrodes that can be used in an electrochemical generator constituting, if necessary, the recharging element itself and which make it possible to recharge the zinc electrode during a large number of charge and discharge cycles without causing the formation of dendrites that produce internal short circuits or changes in the shape of the electrodes.

For this purpose, the invention proposes an electrochemical generator operating device with a zince negative electrode and with alkaline electrolyte charged with zinc salts in which the zinc electrode is of the type known as a scattered electrode and consisting of a multiplicity of approximately spherical-shaped particles comprising a core made of a material resistant to the electrochemical attack and which is wholly or partially coated with a conductive coating, and whose density is greater than that of the electrolyte, characterized in that these particles come into contact by sedimentation with the negative upper face of a flat bipolar current collector when the fluid consisting of the alkaline electrolyte and said particles is not in circulation and are charged with zinc perferably at the collector, said fluid being able to be put in circulation and to be guided into a multiplicity of approximately horizontal parallel pipes with a rectangular section whose lower face consists of said upper face of the flat collector, whose upper face consists of a separator porous to the electrolyte opposing the direct contact of said particles with the positive electrode of the generator, and whose lateral faces are made of an inert material resistant to the alkaline medium, said circulating of the fluid being performed intermittently both during the recharge and discharge phases and according to a periodic off-on cycle characterized in that the off time is greater than the on time. According to a characteristic of the invention, the ratio of the off time and the on time during the discharge phase is less than the same ratio during the recharge phase; the quotient between these two ratios is between 1.5 and 3 and is preferably equal to 2.

The ratio between the off time and the on time during the discharge phase is between 3 and 15 and preferably equal to 10.

The ratio between the off time and the on time during the charge phase is between 1.5 and 8 and preferably equal to 5.

The particles exhibit a diameter between 0.0001 m and 0.0006 m and preferably between 0.0004 m and 0.0005 m with the concentrated potash used as electrolyte. The core of the particles is made of a chemically inert material (electrically insulating) and whose density is between a value approximately equal to a value slightly greater than that of the electrolyte at its minimum of normal density. The volume occupied by the amassed particles is between 15% and 25% of the volume of the particles-electrolyte fluid put in circulation and preferably equal to 17%. The homogeneous circulation speed of the fluid is between 0.05 and 0.7 meter per second.

According to a characteristic of the invention, the current collector is made of sheet steel, with a small thickness on the order of 0.5 millimeter, and whose face in contact with the particles is cadmium-plated or copper-plated superficially while its opposite face in contact with the positive electrode is nickel-plated. The negative face of the current collector projects beyond its ends in relation to the porous separator by a length on the order of the thickness of the space made between the negative face of the collector and the separator, so as to prevent a deposit of zinc on the negative face by "edge effect."

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DETAILED DESCRIPTION OF THE PREFERRED EMBODIMENTS

Figure 1:
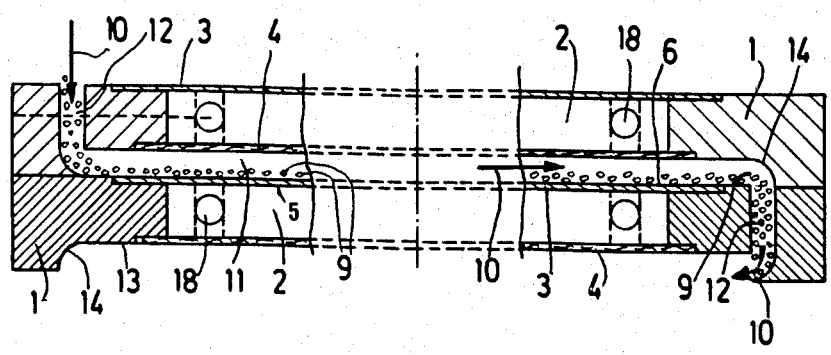
FIG. 1 represents in longitudinal section with cutaways the assembly of two recharge elements according to the invention, along section plane I of FIG. 3.

Referring now to the drawings, wherein like reference numerals designate identical or corresponding parts throughout the several views, and more particularly to FIG. 1 thereof, it is seen that each recharge element according to the invention has in a connecting frame 1 of an electrically insulating plastic chemically inert with respect to the electrolyte, such as polypropylene or polyvinyl chloride (PVC), a positive electrode 2 held between an electric collector 3 and a porous plate 4. Collector 3 is a large sized plate of sheet steel coated, on the side of the positive electrode, with a thin layer 5 of nickel, with a thickness of 5 to 25 microns ($\mu$m) (see FIG. 5) and, on the opposite side forming the negative electrode, with a thin layer 6 of cadmium with a thickness of 3 to 10 microns ($\mu$m) also.

Figure 5:
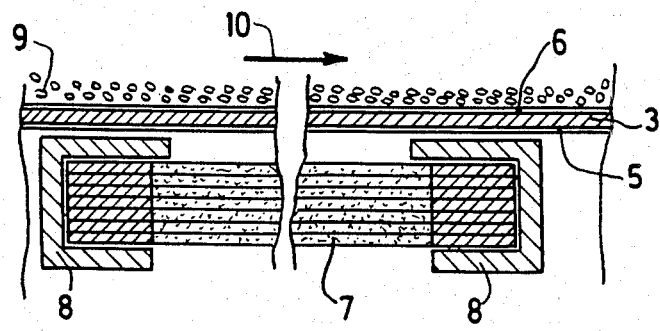
FIG. 5 is the section on a larger scale with cutaways of the active part of a recharge element according to the invention.

The feature of the embodiment of the positive electrode is represented in FIG. 5. The active part of this positive electrode consists of metallic felt strips 7 impregnated in the discharge state with nickel hydroxide (Ni(OH)$_2$) in their active central part, stacked to a thickness of about 5 millimeters and inserted at each of their unimpregnated ends in a support 8 with a U-shaped section and made by folding of a sheet of nickel of about 0.5 millimeter thickness. As is seen in FIG. 5, the length of the arms of the U-shaped claws is approximately equal to the thickness of the stack of felt sheets 7 and the arm located on the side of collector 3 is optionally longer than the arm located opposite.

According to the invention, the negative electrode connected electrically to cadmium layer 6 and to electric collector 3, is formed by a multiplicity of metal-coated particles 9 whose flow is represented in FIG. 1 by arrows 10. These approximately spherical particles whose diameter is between 0.0001 and 0.0006 m and more advantageously between 0.0004 and 0.0005 m, consist of a core of an inert material resistant to electrochemical attack during the operation of the generator such as glass or a polymer and which preferably exhibit a density near and slightly greater than that of the electrolyte at its minimum of normal density. The particles are superficially coated with a thin metal deposit insoluble in the electrolyte, for example, cadmium deposited on a film of nickel or copper. These metal-coated particles, when they are in contact with a collector whose potential is more negative than that corresponding to the zinc deposit and in the presence of a zincate solution, are covered with a layer of zinc which can reach 0.0001 m. Conversely, when the collector is more anodically polarized than the deposit potential of the zinc, a dissolution of the zinc covering the particle is observed.

The particles mixed with the electrolyte in which the electrodes are immersed form a two-phased fluid. Preferably, the electrolyte consists of a concentrated solution of potash KOH (from 5 to 10 moles per liter) having further 3% potassium silicate. Particles 9 are put in circulation by the flow of electrolyte activated by a pump able to propel a mixture of particles and electrolyte made according to the proportions of volume specified below.

To obtain an optimum propelling of the particles by the flow of electrolyte crossing space 11 made between the cadmium-plated negative face 6 of collector 3 and porous plate 4, the concentration of particles of the electrolyte is such that if amassed in a single pile, they would occupy between 15% and 25% of the volume of the particles and the electrolyte put in circulation by the pump. The flow of the fluid crossing space 11 is selected so that the circulation speed of the electrolyte and the particles that it entrains is between 0.05 and 0.7 meter per second, preferably at 0.15 m/s, so as to be able to entrain the particles even when collector 3 is inclined on a slightly rising slope without risking an abrasion, on this collector 3, of the zinc layer covering these particles 9.

In FIG. 1, it is seen that the charge elements are identical and can be superposed two by two by alternating the position of pipes 12 for cross passage of the electrolyte to place them at the input on one element and at the output on the following adjacent element. Space 11 is made by a hollow face 13 exhibiting a rounding 14 for guiding of the particles 9 placed alternatively on both sides of the elements.

Figure 2:
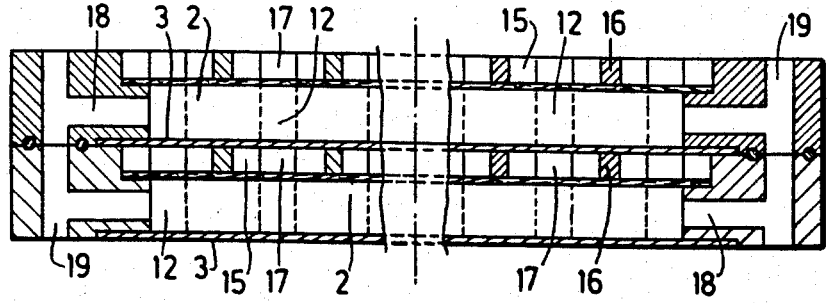
FIG. 2 represents in cross section with cutaways the assembly of FIG. 1, along section plane II of FIG. 3.
Figure 3:
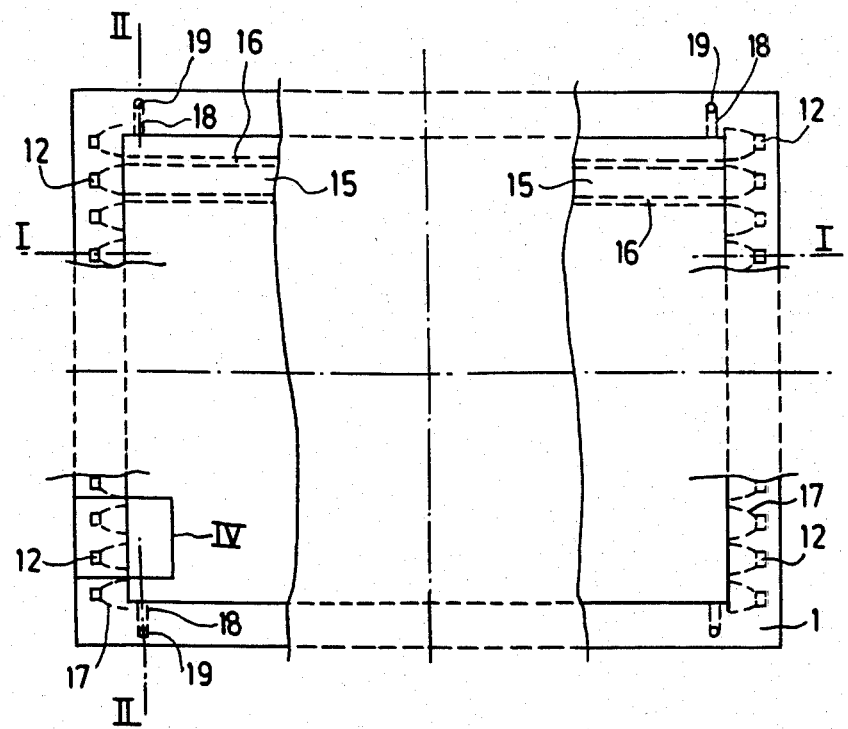
FIG. 3 represents in top view with cutaways a recharge element according to the invention.
Figure 4:
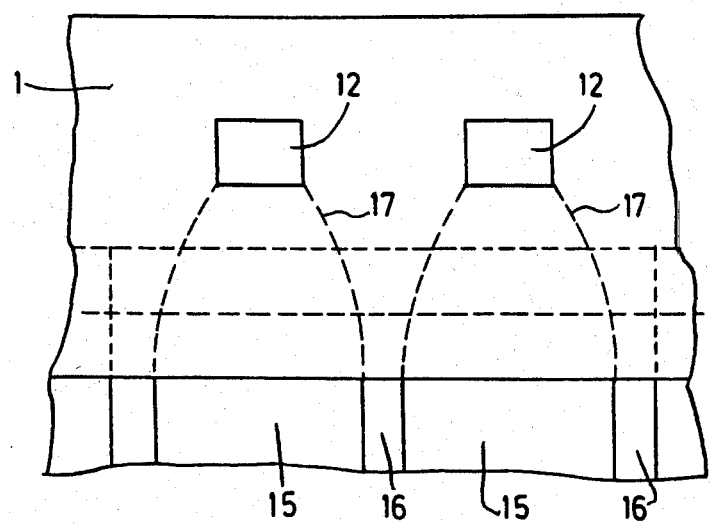
FIG. 4 represents on a larger scale the part of FIG. 3 delineated by reference number IV.

If FIG. 2 which is a section in a place perpendicular to the plane of the section in FIG. 1 is referred to, it is seen that space 11 is subdivided into longitudinal pipes 15 with a flattened shape, by separators 16 of a porous material such as polyethylene, PVC or ABS. Each of the pipes 15 is connected to each of its ends at a transfer pipe constituting the cross passage pipe 12 and preferably exhibiting a square or rectangular section (see FIGS. 3 and 4). This connection is made by an intermediary pipe 17 whose section gradually is changed from the shape of a flat parallelogram at the output of longitudinal pipe 15 to the section of the approximately square transfer pipe 12. Lateral degassing pipes 18 can be in the connecting frame 1, on the side parallel with longitudinal pipes 15, and thus each connects a lateral face of the positive electrode 2 to a degassing collector pipe 18 which fits on the degassing pipe of the neighboring element to make a vertical degassing column.

According to an important characteristic of the embodiment represented in FIG. 1 and confirmed by FIG. 2, face 5 of current collector 3 which is in contact with the positive electrode, is set at its ends in connecting frame 1 in plastic while its negative face 6 remains free and in contact with particles 9 to constitute the input wall of pipes 12. As can be seen in FIG. 1, this cadmium-plated negative face 6 projects beyond its ends in relation to porous separator 4 with a length in the vicinity of that of the thickness of space 11 constituting the thickness of pipes 12. This arrangement prevents the formation of a zinc deposit on this negative face 6 by an "edge effect" of the electric currents which travel through the electrolyte between porous wall 4 and negative face 6. When the charge element is also used at the discharge, in the case of a use of an accumulator for example, the porous or fibrous separator 4 can be sealed in the regions which are not located opposite the active part of metallic felt strips 7.

Figure 6:
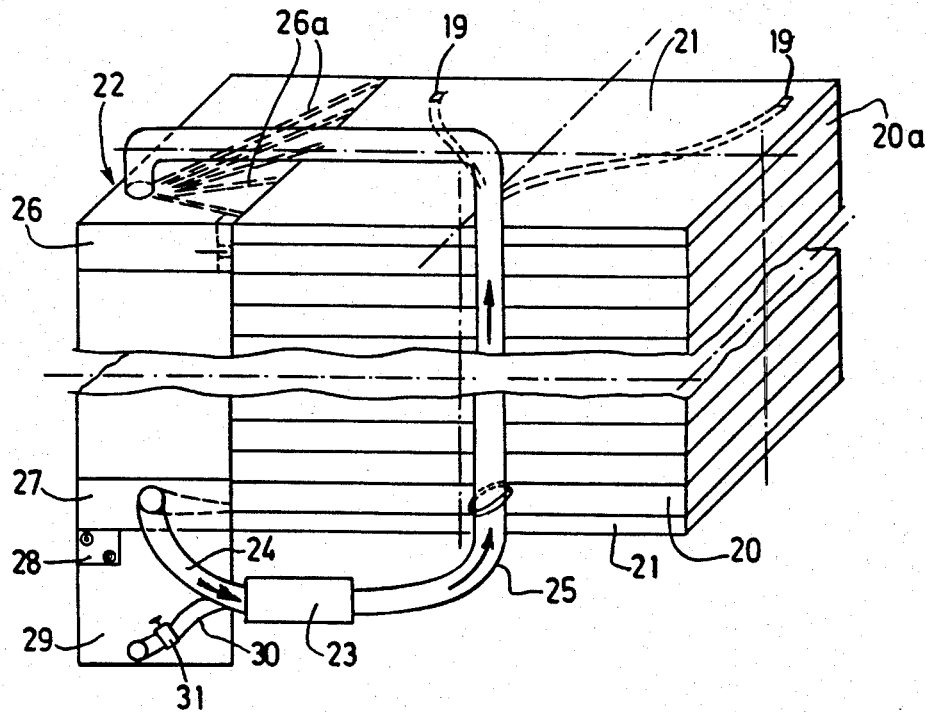
FIG. 6 is a diagrammatic representation in perspective of an electric storage battery using the process and zinc recharge elements according to the invention.

FIG. 6 represents, in diagrammatic perspective, a battery with recharge and discharge elements according to the invention arranged to function as an electrical storage battery and for discharging of electric energy. This battery consists of a vertical stack of charge elements 20 according to the invention, held between end plates 21. These stacked elements 20 are supplied with electrolyte charged with particles 9 from upper element 20a and from a distributor collector block 22 by a pump 23 which sucks the electrolyte and the particles that it contains into a suction pipe 24 and discharges it by a discharge pipe 25 into an upper distribution block 26. Partition walls 26a, represented diagrammatically by a dotted line, are provided in upper distribution block 26 to distribute in the most equal way possible, the electrolyte flow and especially of particles at the input of each of the flattened longitudinal pipes 15 of upper element 20a. Actually, pipes 15 of each element 20, as they are assembled in the battery, come out at their downstream end exactly opposite of transfer pipes 12 of the element immediately below so that they constitute, in the assembled battery, series of zig-zag parallel veins through which the electrolyte and particles 9 that they carry travel without any communication between these veins until the joining of the various separate flows in a lower collector 27 connected by a set of valves 28 to a drainage tank 29 of the electrolyte. This drainage tank 29 makes it possible to drain the battery of its electrolyte during the off phases so as to prevent its discharge by the stray shunt current which exist in the absence of any connection between the positive and negative terminals of the battery. To restore the electrolyte and particles 9 to service after their drainage into tank 29, a recovery pipe 30 controlled by a valve 31 connects the bottom of tank 29 to the suction of pump 23. Tank 29 can have a filter making it possible to separate the particles from the electrolyte which in the charged state consists essentially of potash and in the discharged state, has a strong charge of zinc in the form of zincates soluble in the potash in strong concentration. The operation of the charge element according to the invention, insulated or mounted in the battery, is performed in the following manner. After refilling with electrolyte charged with particles to perform the zinc recharge, the electrodes of the element or of the battery are placed under an electric recharge voltage and the electrolyte is circulated by the pump (pump 23 of the battery).

Various modes are possible for the control of the circulation of the electrolyte and the particles during the zinc recharge.

The recharge should be performed with intermittent circulation of the fluid. The ratio between the period of the off times and the period of the on times is between 3 and 15 and preferably is equal to 10. The period of the off phase must not be greater than two minutes to obtain regular zinc deposits on the particles 9. The sections of the pipes and piping through which the total or partial flow of the particles-electrolyte mixture travels are selected so as to achieve the best compromise between the shunt currents which increase with the section of the veins of fluid and of the collector pipes and the load losses in these pipings which diminish when the section of the piping increases. Experimental tests have shown that the best recharge results are obtained with off periods of thirty seconds followed by circulating of the particles and the electrolyte for about 5 seconds.

For the discharge modes of the element or the battery operating as a source of electric current at its terminals, a system of intermittent circulation can be adopted. However, the ratio between the off time and the on time is between 1.5 and 8 and preferably equal to 5.

To understand what technical results this invention makes it possible to obtain with an electric battery, some of the calculated characteristics obtained with an experimental battery made according to the invention will now be specified.

In a 30 element battery whose average charging voltage for each one is about 1.5 volts, particles with a diameter of 0.3 to 0.5 mm are used whose core exhibits a density of 1.1 and whose bulk volume (in squared section enveloping the particles) reaches 17% of the total volume of the electrolyte. Each element thus contains about 1,250 grams of a mixture of electrolyte (KOH at 8 moles per liter), zinc and particles and weighs about 3,200 grams for a theoretical load capacity of 220 Amperes/hour. A pump with a theoretical power of 25 watts driven by an electric motor consuming 60 watts is enough to assure the circulation of the electrolyte in the battery. Drainage tank 29 of the electrolyte and of the particles must have a capacity of at least 25 liters and the particles which, in the fully charged state, carry about 6 kilograms of zinc, represent a volume of about 3.5 liters. The 30 element battery reaches, with all its accompanying elements such as the pump and the electrical connections, a weight of about 100 kilograms and can store an electrical energy of about 7 kWh. The battery contains an accompanying tank which is used to degas the positive electrodes via pipes 18.

Of course, the invention is not limited to the embodiments described and represented and it is capable of numerous variants within the reach of the man of the art, without deviating from the spirit of the invention.

Thus, for the charge periods, the electric charging circuit can be interrupted during the circulating sequences. Collector 3 can consist, not of a thin metal sheet as previously described, but also of a polymer conductor of electricity, such as ABS charged with carbon, covered on the side of the positive electrode 2 with a layer of nickel. The part of the polymer sheet (with a thickness of about 1 millimeter) which comes in contact with the balls then cannot be copper-plated or cadmium-plated, but left in the raw state.

For collectors 3 consisting of a metal sheet such as sheet steel, the side forming the negative electrode cannot be cadmium-plated, but copper-plated. Likewise, in the metal-coating sublayer of particles 9, the cadmium (deposited if necessary on a film of nickel or copper) can be replaced with a layer of copper.

In the battery with recharge elements represented diagrammatically in FIG. 6, instead of feeding simultaneously, and therefore approximately equally, all the veins delimited by pipes 12 and 15, (FIG. 2), pipes or groups of pipes 12, 15 can be fed successively using a distribution element such as a revolving or reciprocating machine which periodically close off or, if necessary, open the inputs of pipes 12, 15 delimiting the flow veins for the mixture of particles 9 and electrolyte.

Pipes 12, 15 can exhibit approximately identical sections which leads to the elimination of the reduction of section of the intermediary pipe 17.

Additives providing a better morphology to the zinc deposit can be added to the electrolyte consisting mainly of a concentrated solution of potash. Experimental batteries made according to the invention have thus been able to support more than 1000 charge and discharge cycles.

I claim:

1. An electric storage battery having a plurality of electrochemical generator operating devices each having a zinc negative electrode and operating in a charge and a recharge phase with each of said devices comprising:
   a plurality of approximately horizontal parallel pipes (15) having a rectangular cross section whose lower face consists of a negative upper face (6) of a flat bipolar current collector (3) and wherein a upper face of each of said parallel pipes includes a separator (4) and whose lateral faces are made of an inert material resistant to an alkaline medium;
   a positive electrode;
   a fluid capable of circulating in said plurality of horizontal pipes wherein said fluid includes a alkaline electrolyte charged with zinc salts and a plurality of spherical-shaped particles with said particles having a core made of a material resistant to electrochemical attack and which core is at least partially coated with a conductive coating whereby the density of said particles is greater than that of said electrolyte and whereby said particles come into contact by sedimentation with said negative upper face of said flat bipolar current collector when said fluid consisting of said alkaline electrolyte and said particles is not in circulation and wherein said particles are charged with zinc at said collector; wherein each of said plurality of operating devices are superposed vertically on one another so that said horizontal pipes of each operating device are superposed on the horizontal pipes of another operating device and wherein each of said superposed pipes are connected to each other by transfer pipes for transferring said fluid successively to each of said superposed pipes and wherein the output of said fluid from an upper element is opposite the input of the fluid in the element immediately below said upper element and whereby said fluid at the input of said upper element is discharged and recovered so that said particles of said fluid entrained by the flow of said electrolyte make a zig-zag parallel back and forth travel in successive elements in said vertically disposed devices by the continuous contact of said particles against the negative face of said current collector of each of said elements; and wherein said electric storage battery further comprises;

intermittent pump means for intermittently circulating said fluid into said plurality of horizontal parallel pipes of each of said operating devices wherein said intermittent pump means operates according to a periodic off-on cycle during both said recharge and said discharge phases of said device in such a manner that the off time of said pump is greater than the on time of said pump.

2. The device according to claim 1 wherein said intermittent pump means operates so that the ratio between the off time and the on time during said recharge phase is greater than the ratio between the off time and the on time during said discharge phase.

3. Device as in any one of claims 1 or 2, wherein the ratio between the off time and the on time during the recharge phase is between 3 and 15.

4. Device as in claim 3, wherein the ratio between the off time and the on time during the discharge phase is between 1.5 and 8.

5. Device as in any one of claims 1 or 2, wherein the diameter of said particles is between 0.0001 m and 0.0006 m.

6. Device as in any one of claims 1 or 2, wherein said circulation is performed in a homogeneous speed between 0.05 and 0.17 m/s.

7. Device as in any one of claims 1 or 2, wherein the volume occupied by said particles (9) is between 15% and 25% of the volume of the electrolyte.

8. Device as in any one of claims 1 or 2, wherein said said pipes have a width between 0.02 m and 0.05 m, a height between 0.002 m and 0.005 m and a length between 0.15 m and 0.75 m.

9. Device as in any one of claims 1 or 2, wherein the current collector (3) is made of sheet steel with a slight thickness on the order of 0.5 millimeter and whose face (6) in contact with the particles is cadmium-plated or copper-plated at least superficially while its opposite face (5) in contact with the positive electrode (2) is nickel-plated.

10. Device as in any one of claims 1 or 2, wherein the negative face (6) of the current collector (3) projects beyond its ends in relation to the porous separator by a length greater than or equal to 0.5 times the height of said pipes so as to prevent a zinc deposit on the negative face by "edge effect."

11. Device as in any one of claims 1 or 2, wherein the collector (3) consists of a conductive polymer, with a thickness of about 1 millimeter, covered on the side of the positive electrode (2) with a layer of nickel.

12. Device as in claim 11, wherein the porous separator (4) is sealed opposite the parts of the positive electrode (2) which, although conductive, are devoid of active material.

13. The device according to claim 1 wherein parallel flow veins of said fluid delimited by said transfer pipes and said superposed pipes are fed successively in a mixture by a revolving or reciprocating distribution element which periodically closes or opens the inputs of said transfer pipes and said superposed pipes which pipes delimit the flow veins of the fluid formed by said particles and said electrolyte.

* * * * *